(12) United States Patent
Lin

(10) Patent No.: US 9,383,485 B2
(45) Date of Patent: Jul. 5, 2016

(54) DIFFUSION PLATE AND BACKLIGHT MODULE HAVING SAME

(71) Applicant: HON HAI PRECISION INDUSTRY CO., LTD., New Taipei (TW)

(72) Inventor: Chen-Han Lin, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 31 days.

(21) Appl. No.: 14/306,424

(22) Filed: Jun. 17, 2014

(65) Prior Publication Data

US 2014/0369029 A1 Dec. 18, 2014

(30) Foreign Application Priority Data

Jun. 17, 2013 (TW) ............... 102121305 A

(51) Int. Cl.
G02B 5/02 (2006.01)
G02B 1/115 (2015.01)

(52) U.S. Cl.
CPC .............. G02B 5/0242 (2013.01); *G02B 1/115* (2013.01)

(58) Field of Classification Search
None
See application file for complete search history.

(56) References Cited

U.S. PATENT DOCUMENTS

| 6,650,382 | B1* | 11/2003 | Sumida | ............ G02F 1/133553 349/63 |
| 2004/0051950 | A1* | 3/2004 | Noguchi | ................ G02B 1/115 359/603 |
| 2004/0114248 | A1* | 6/2004 | Hokazono | .............. G02B 1/111 359/603 |
| 2007/0110386 | A1* | 5/2007 | Chiang | ................ G02B 5/0231 385/147 |

* cited by examiner

*Primary Examiner* — Mary Ellen Bowman
(74) *Attorney, Agent, or Firm* — ScienBiziP, P.C.

(57) ABSTRACT

A backlight module employing a diffusion plate is provided. The diffusion plate includes a main body and antireflection films formed on surfaces of the main body. The main body includes a light incident surface, and a light emitting surface opposite to the light incident surface. Each antireflection film has a number of antireflection film layers. A thickness of each antireflection film layer is less than a wavelength of visible light.

6 Claims, 2 Drawing Sheets

DIFFUSION PLATE AND BACKLIGHT MODULE HAVING SAME

FIELD

The present disclosure relates to backlight modules having a diffusion plate.

BACKGROUND

Backlight modules are used as illuminating devices for displays of electronic devices. A direct illumination-type backlight module typically includes a plurality of light sources, and a diffusion plate opposite to the light sources. The light sources are arranged as a matrix at a side of the diffusion plate.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
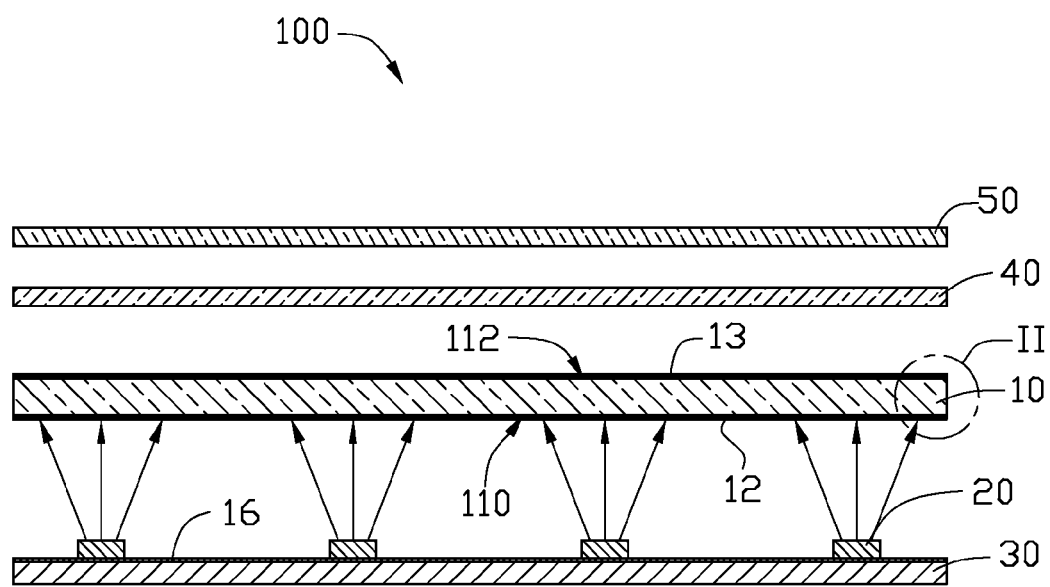
FIG. 1 is a cross sectional view of an exemplary embodiment of a backlight module of the present disclosure, the backlight module including a diffusion plate.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure is described in relation to a diffusion plate for a backlight module. The diffusion plate comprises a main body and an antireflection film. The main body comprises a light incident surface and a light emitting surface opposite to the light incident surface. The antireflection film is formed on at least one of the light incident surface and the light emitting surface. The antireflection film comprises a plurality of antireflection film layers. A thickness of each antireflection film layer is less than a wavelength of visible light.

The present disclosure is also described in relation to a backlight module. The backlight module comprises a diffusion plate and a plurality of light sources. The diffusion plate comprises a main body and an antireflection film formed on the surface of the main body. The main body comprises a light incident surface and a light emitting surface opposite to the light incident surface. The antireflection film is formed on at least one of the light incident surface and the light emitting surface. The antireflection film comprises a plurality of antireflection film layers. A thickness of each antireflection film layer is less than a wavelength of visible light. The light sources are located at a light incident side of the diffusion plate.

The present disclosure is also described in relation to a backlight module. The backlight module comprises a diffusion plate, a plurality of light sources, a prism sheet, and a diffusion sheet. The diffusion plate comprises a main body, a first antireflection film, and a second antireflection film. The main body comprises a light incident surface and a light emitting surface opposite to the light incident surface. The first antireflection film is formed on the light incident surface, and the second antireflection film is formed on the light emitting surface. Each of the first antireflection film and the second antireflection film includes from ten to one-hundred antireflection layers, a thickness of each antireflection layer is less than a wavelength of visible light, refractive indexes of any two adjacent antireflection layers are different, and light diffusing particles are dispersed in the main body. The light sources are located at a light incident side of the diffusion plate for illuminating the light incident side of the diffusion plate. The prism sheet is located on the light emitting side of the diffusion plate for receiving light emitted from the light emitting side of the diffusion plate, and is configured for changing emitting angles of the light emitted from the light emitting side of the diffusion plate. The diffusion sheet is located on a side of the prism sheet away from the diffusion plate, and is configured to diffuse light emitted from the prism sheet.

Figure 2:
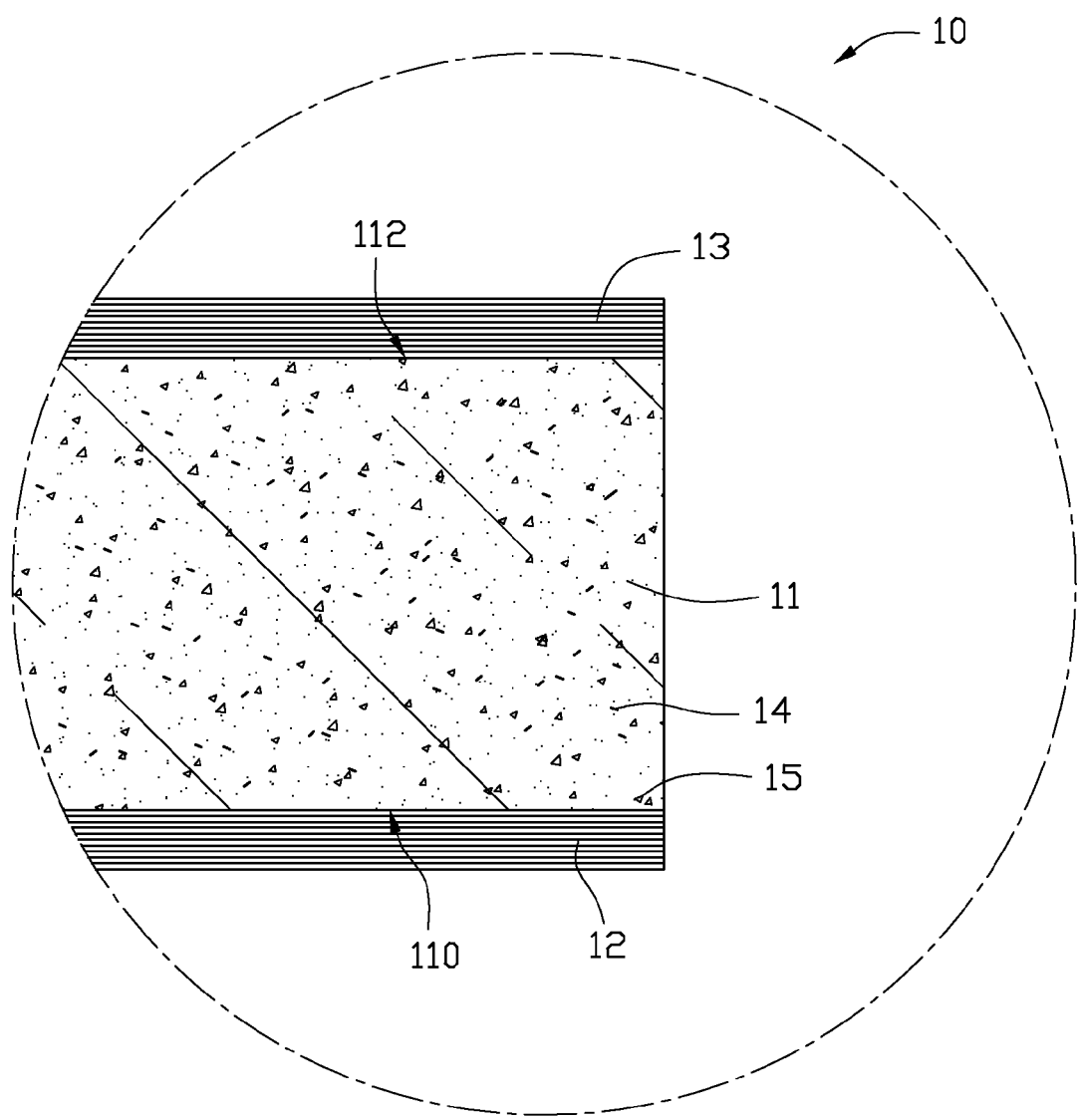
FIG. 2 is an enlarged view of circled part II of the backlight module in FIG. 1.

FIGS. 1-2 illustrate an embodiment of a backlight module 100. The backlight module 100 includes a diffusion plate 10, a plurality of light sources 20, a substrate 30, a prism sheet 40, and a diffusion sheet 50.

The diffusion plate 10 includes a main body 11, a first antireflection film 12, and a second antireflection film 13.

The main body 11 includes a light incident surface 110, and a light emitting surface 112 opposite to the light incident surface 110. The main body 11 is made of a transparent material. In detail, a material of the main body 11 can be polycarbonate (PC), polymethyl methacrylate (PMMA), methyl methacrylate, styrene copolymer (MS), polyethylene glycol terephthalate (PETG), polystyrene (PS), or a mixture of two or more of the above materials. A plurality of diffusing particles 14, 15 are dispersed in the main body 11. The diffusing particles 14, 15 diffuse light entering the main body 11. A material of the diffusing particles 14, 15 can be silicon (Si), silicon dioxide ($SiO_2$), titanium dioxide ($TiO_2$), methyl methacrylate, PMMA, MS, PS, or a mixture of two or more of the above materials.

The first antireflection film 12 is formed on the light incident surface 110 of the main body 11 by a plating process. The first antireflection film 12 is configured to reduce reflection of visible light emitted thereon by the light sources 20, and to enhance a light diffusing efficiency of the diffusion plate 10. In this embodiment, the first antireflection film 12 includes a plurality of first antireflection film layers (not labeled). In particular, the first antireflection film 12 can include from about 10 to about 100 first antireflection film layers. A thickness of each first antireflection film layer is less than a wavelength of visible light. Thus, reflection of visible light by each antireflection film layer is reduced. Refractive indexes of any two adjacent first antireflection film layers are different. Thus, diffusion of incident light through the first antireflection film 12 into the main body 11 is enhanced.

The second antireflection film 13 is formed on the light emitting surface 112 by a plating process. The second antireflection film 13 is configured to reduce reflection of visible light emitted through the main body 11, and to enhance a light emitting efficiency of the diffusion plate 10. In this embodiment, the second antireflection film 13 includes a plurality of second antireflection film layers (not labeled). In particular, the second antireflection film 13 can have from about 10 to about 100 second antireflection film layers. A thickness of each second antireflection film layer is less than the wavelength of visible light. Thus, reflection of visible light by each second antireflection film layer is reduced. Refractive indexes of any two adjacent second antireflection film layers are different. Thus, diffusion of light through the second antireflection film 12 from the main body 11 is enhanced.

In another embodiment, either the first antireflection film 12 or the second antireflection film 13 can be omitted.

The light sources 20 are located between a light incident side of the diffusion plate 10 and the substrate 30.

The substrate 30 is electrically connected to the light sources 20 and is configured to supply power to the light sources 20. The substrate 30 includes a reflection surface 16 to reflect light emitted from the light sources 20 to the diffusion plate 10, thereby increasing a utilization rate of light. In this example, the light sources 20 are mounted on the reflection surface 16. In another example, the reflection surface 16 could be on the side of the substrate opposite from the light sources 20.

The prism sheet 40 is located at a light emitting side of the diffusion plate 10 and is configured to change emitting angles of the light emitted from the light emitting surface 112.

The diffusion sheet 50 is located on a side of the prism sheet 40 away from the diffusion plate 10, and is configured to diffuse light emitted from the prism sheet 40.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A backlight module, comprising:
   a diffusion plate, comprising:
      a main body comprising a light incident surface and a light emitting surface opposite to the light incident surface; and
      a first antireflection film directly formed on the light incident surface, and a second antireflection film directly formed on the light emitting surface, each of the first and second antireflection films comprising a plurality of antireflection film layers, a thickness of each antireflection film layer being less than a wavelength of visible light;
   a prism sheet located on the light emitting side of the diffusion plate for receiving light emitted from the light emitting side of the diffusion plate, and configured for changing emitting angles of the light emitted from the light emitting side of the diffusion plate;
   a diffusion sheet located on a side of the prism sheet away from the diffusion plate, and configured to diffuse light emitted from the prism sheet; and
   a plurality of light sources located at a light incident side of the diffusion plate;
   wherein the prism sheet is positioned between the first antireflection film and the diffusion sheet, and the prism sheet is directly positioned on first antireflection film.

2. The backlight module of claim 1, wherein the antireflection film includes from about 10 to about 100 antireflection film layers.

3. The backlight module of claim 1, wherein refractive indexes of any two adjacent antireflection film layers are different.

4. The backlight module of claim 1, wherein a plurality of diffusing particles is dispersed in the main body.

5. The backlight module of claim 1, further comprising a substrate, the light sources being located between the diffusion plate and the substrate, the substrate being electrically connect to the light sources and being configured to supply power to the light sources.

6. The backlight module of claim 5, wherein the substrate includes a reflection surface to reflect light emitted from the light sources to the diffusion plate.

* * * * *